United States Patent [19]

Sklaroff

[11] Patent Number: 5,170,341

[45] Date of Patent: Dec. 8, 1992

[54] ADAPTIVE CONTROLLER IN A PROCESS CONTROL SYSTEM AND A METHOD THEREFOR

[75] Inventor: Morton Sklaroff, Fort Washington, Pa.

[73] Assignee: Honeywell Inc., Minneapolis, Minn.

[21] Appl. No.: 602,994

[22] Filed: Oct. 24, 1990

[51] Int. Cl.$^5$ .............................................. G05B 13/02
[52] U.S. Cl. ..................................... 364/162; 364/157
[58] Field of Search ............................ 364/157–162, 364/148, 163; 318/561, 609–611

[56] References Cited

U.S. PATENT DOCUMENTS

| | | | |
|---|---|---|---|
| 4,754,391 | 6/1988 | Suzuki | 364/157 |
| 4,983,898 | 1/1991 | Kanda | 364/157 |
| 4,903,192 | 2/1990 | Saito et al. | 364/162 |

Primary Examiner—Jerry Smith
Assistant Examiner—Thomas E. Brown
Attorney, Agent, or Firm—A. A. Sapelli; W. Udseth; A. Medved

[57] ABSTRACT

An apparatus of a process control system for controlling a process variable of a process includes an adaptive controller tuned to the process. The process variable output signal of the process is coupled to a difference device and also coupled to the adaptive controller, thereby permitting the adaptive controller to monitor the process variable signal independently of an error signal outputted from the difference device. Any changes detected in the process variable signal without a corresponding change in the setpoint signal inputted to the difference device initiates an adjustment in the tuning parameters of the adaptive controller thereby providing continual, optimal, control of the process.

2 Claims, 5 Drawing Sheets

ADAPTIVE CONTROLLER IN A PROCESS CONTROL SYSTEM AND A METHOD THEREFOR

BACKGROUND OF THE INVENTION

The present invention relates to PID-type controllers, and more particularly, to an automatically tuned PID-type controller and an adaptive control method therefore.

In a conventional feedback process control system, a proportional-plus-integral-plus-derivative (PID) operation is performed with respect to a deviation (e) between a set point (sp) and a controlled variable (pv) fed back from the process, and the result of the PID operation is supplied as a control signal to the process. In order to perform an optimum control of the process, it is necessary that the PID parameters for performing the respective PID operation are set to their optimum values. Conventionally, the PID parameters have been manually adjusted. For implementing the manual adjustment, a step response method and a marginal sensitivity method have been well-known. In both the methods, however, it takes a long time for the measurement of characteristic, and the process control is stopped while the measurement is effected so that the value of pv obtained at that time cannot be the most desirable one.

On the other hand, methods have been proposed in which the PID parameters are automatically determined (i.e., not manually determined.) Such an automatic method is described in U.S. Pat. No. 4,754,391. However, should any changes occur in the process, the controller must be retuned, the retuning being initiated manually.

In the adaptive controller and method of the present invention, the process output is monitored. Thus, if a process change takes place after line-out (i.e., after sp=pv) sufficient to cause a predetermined error without a corresponding change in the setpoint (sp), the adaptive controller of the present invention initiates an analysis of the process and retunes the PID parameters to optimize control of the process.

SUMMARY OF THE INVENTION

Thus there is provided by the present invention an adaptive controller for controlling a process, the output of the process being monitored, and a method for retuning parameters of the adaptive controller, thereby achieving optimal automatic control of the process. In a process control system, there is included an apparatus (industrial controller) for controlling a process variable of a process, the process having a predetermined transfer function and predetermined process parameters associated therewith. The apparatus comprises a difference device, having a first and second input, for outputting an error signal which is the difference of a first signal coupled to the first input of the difference device, and a second signal coupled to the second input of the difference device. Also included is an adaptive controller connected to the difference device and to the process. The adaptive controller receives the error signal from the difference device, and generates an output control signal coupled to the process. The adaptive controller is tuned to the process such that the output control signal causes the process to output a process variable signal having a predetermined characteristic. The process variable signal is coupled to the second input of the difference device and also coupled to the adaptive controller, thereby permitting the adaptive controller to monitor the process variable signal independently of the error signal. This configuration permits detection of any changes of the process variable signal as a result of disturbances of the process parameters, whereupon adjustment of the tuning of the adaptive controller is performed.

A method for adaptively tuning the adaptive controller, comprises the steps of (upon receiving an input which indicates the control process is to start) outputting a step function for the output control signal having a value in which the process variable signal is to equal a setpoint signal value, the setpoint signal being inputted to the process control system. The process variable is sensed to identify the process, and tuning parameters for the adaptive controller are calculated. After line-out occurs, the process variable signal is monitored. If any changes occur in the process variable signal without a corresponding change in the setpoint signal, the tuning parameters are adjusted to compensate for process parameter changes; otherwise, if no changes occur in the process variable signal, the error signal is monitored. If a new setpoint value is inputted, the method is repeated from the beginning starting with outputting a step function and identifying the process.

Accordingly, it is an object of the present invention to provide an adaptive controller.

It is a further object of the present invention to provide an adaptive controller, whereby the adaptive controller is automatically retunable to provide optimal control of a process being controlled.

It is another object of the present invention to provide an adaptive controller, whereby the adaptive controller directly monitors an output of a process being controlled.

It is still another object of the present invention to provide an adaptive controller, whereby the adaptive controller directly monitors an output of a process being controlled to initiate a retuning of the adaptive controller upon detecting predetermined conditions exist.

It is yet another object of the present invention to provide an adaptive controller and a method for automatically retuning the adaptive controller to provide optimal control of the process being controlled, the automatic retuning being initiated upon detecting the existence of predetermined conditions.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIGS. 2A through 2C, together forming FIG. 2, show block diagrams of typical control systems or portions thereof;

DETAILED DESCRIPTION

Figure 1:
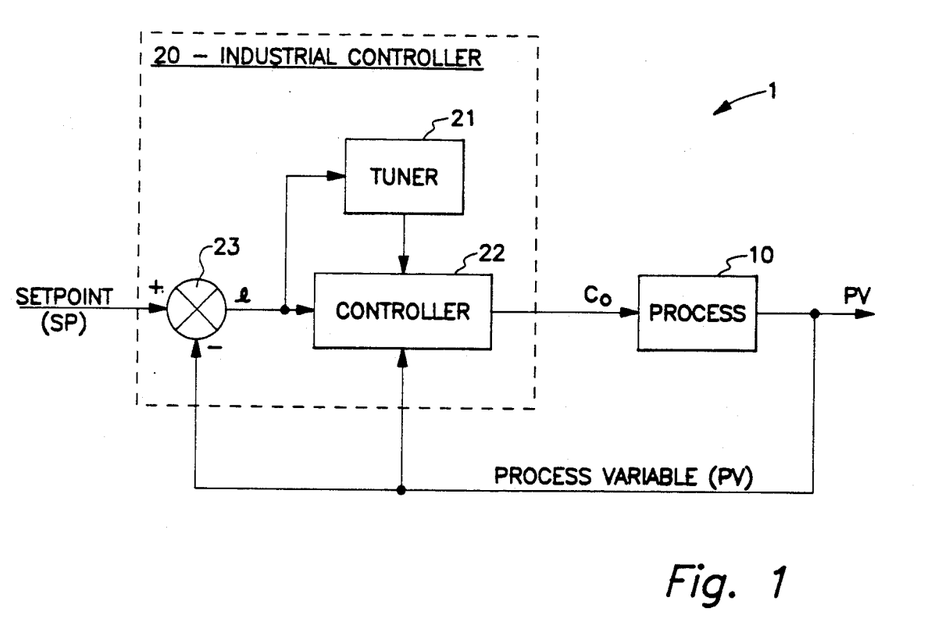
FIG. 1 shows a block diagram of a control system, which includes an adaptive controller of the present invention, and wherein the adaptive controller utilizes the method therefore.

Referring to FIG. 1, there is shown a block diagram of a control system which incorporates the adaptive controller of the present invention. The control system 1 includes a process 10, which outputs a signal, PROCESS VARIABLE (pv), of a predetermined parameter such as temperature, pressure, flow,.... An input signal to the system 1, SETPOINT (sp) has a value associated therewith indicative of a desired value for the output, or process variable. The setpoint signal and process variable signal are inputted to a difference device 23, which outputs an error signal, e, which is then coupled to a tuner 21 and a controller 22. The controller 22 can be a microprocessor well know to those skilled in the art. The tuner 21 and controller 22 operate in conjunction with one another thereby forming the adaptive controller of the present invention. The controller 22 receives the error signal and generates an output signal, $C_o$, therefrom which causes the output signal of the process 10 to track the input signal, such that sp=pv, at which time lineout is said to occur. The difference device 23, the tuner 21, and the controller 22, can be packaged together to form an industrial controller 20. In the preferred embodiment of the present invention the output signal (process variable—pv) is coupled directly into controller 22. In this manner, the controller, under software control, can decouple the error input signal and input the process variable signal thereby enabling the controller 22 to directly monitor the process 10. In this manner, after the adaptive controller 21, 22 (sometimes referred to herein as controller 22 for simplicity) has initially identified the process (to be described hereinunder) and tuned itself, if a process parameter change occurs, the change can be readily detected by the adaptive controller. The detected change can be in one or more of the variables, process gain, time constants, or dead time (i.e. a change in the process 10). Changes in the process 10, and hence the process parameter(s), may cause pv to oscillate, may cause pv to go into a damped oscillation, . . . In such a case, the controller 22 will require compensating changes to be made in the PID parameters in order to maintain pv at the set point. Thus the adaptive controller of the present invention "retunes" itself automatically in response to changes detected in the process 10 without any corresponding change to the setpoint signal.

Figure 2A:
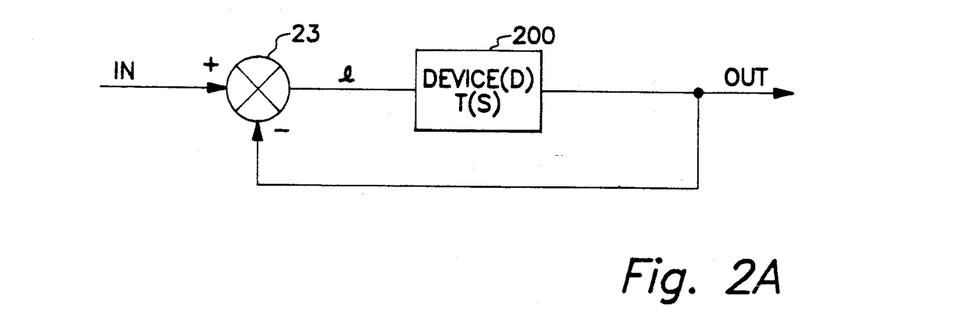
Figure 2B:
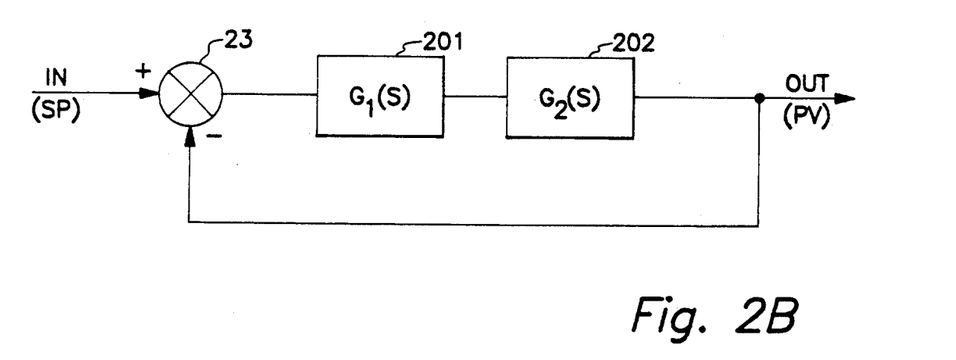
Figure 2C:
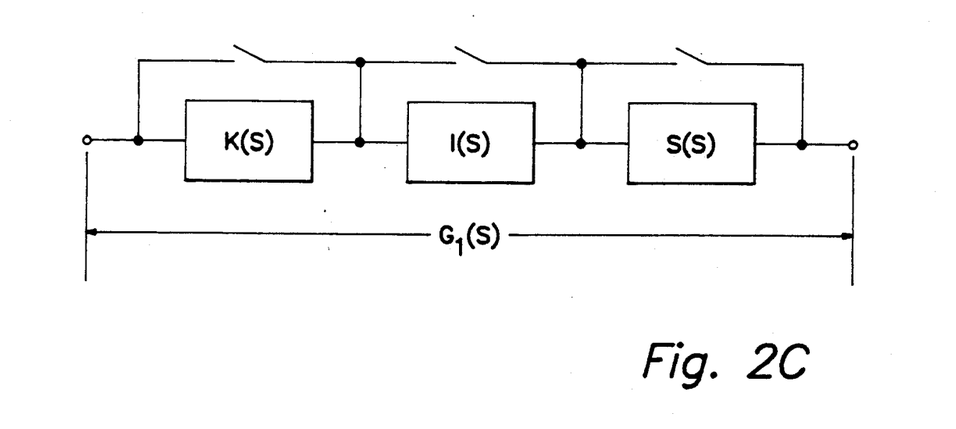

Referring to FIG. 2a, which together with FIGS. 2b and 2c, form FIG. 2, there is shown a block diagram of a typical control system. FIG. 2a includes a device 200 having a device input and output, and a transfer function T(s). An input signal, IN, and the output of the device D 200 (OUT) are connected to a difference device 23 which outputs an error, e, to the device input such that:

$$OUT = IN \left[ \frac{T(s)}{1 + T(s)} \right] \quad (1)$$

In response to a step input, $$OUT = IN \frac{T(s)}{S[1 + T(s)]} \quad (2)$$

Referring to 2b, there is shown a block diagram of a typical device of a control system, similar to that of FIG. 2a, in which the device of FIG. 2a is split into two devices 201, 202. The transfer function of the boxes 201, 202 in combination being equal to that of the device 200 of FIG. 2a. Thus, the transfer function of the split devices of FIG. 2b is:

$$T(s) = G_1(s) \cdot G_2(s) \quad (3)$$

where;
pv = process variable (actual value)
sp = set point (desired or commanded value)
$G_1(s)$ = transfer function of industrial controller 20 (or controller 22)
$G_2(s)$ = transfer function of process 10

Most industrial processes consist of one or two lags with or without dead time. Thus the respective transfer functions take the following form:

a) single lag without dead time—

$$G_2(s) = \frac{K}{(s + a)}$$

b) for double lag without dead time—

$$G_2(s) = \frac{K}{(s + a)(s + b)}$$

c) for single lag with dead time—

$$G_2(s) = \frac{Ke^{-DTs}}{(s + a)}$$

d) for double lag with dead time—

$$G_2(s) = \frac{Ke^{-DTs}}{(s + a)(s + b)}$$

The Box 202 has a transfer function $G_2(s)$ which is a function of the process 10, and therefore, is essentially given; hence, there is no control over the process parameters which can be exercised. Box 201 has a transfer function $G_1(s)$, the transfer function of the controller 20. The transfer function $G_1(s)$ is controllable and can be shown to be $$G_1(s) = \frac{G_c(sT_i + 1)(sT_d + 1)}{sT_i(asT_d + 1)}$$

Box 201 is divided further as shown in FIG. 2(c) such that:

$$K(s) = G_c \text{ (Gain)}$$

$$I(s) = \frac{T_i s + 1}{T_i s}$$

$$S(s) = \frac{T_d s + 1}{aT_d s + 1}$$

Thus $G_1(s) = K(s) I(s) S(s)$, and for the process $G_2(s)$ being of the type:
a) single lag without dead time—

$$G_1(s) = K(s) \, I(s)$$

b) double lag without dead time—

$$G_1(s) = K(s) \, I(s) \, S(s)$$

c) single lag with dead time—

$$G_1(s) = K(s) \, I(s)$$

d) double lag with dead time—

$$G_1(s) = K(s) \, I(s) \, S(s)$$

Figure 3:
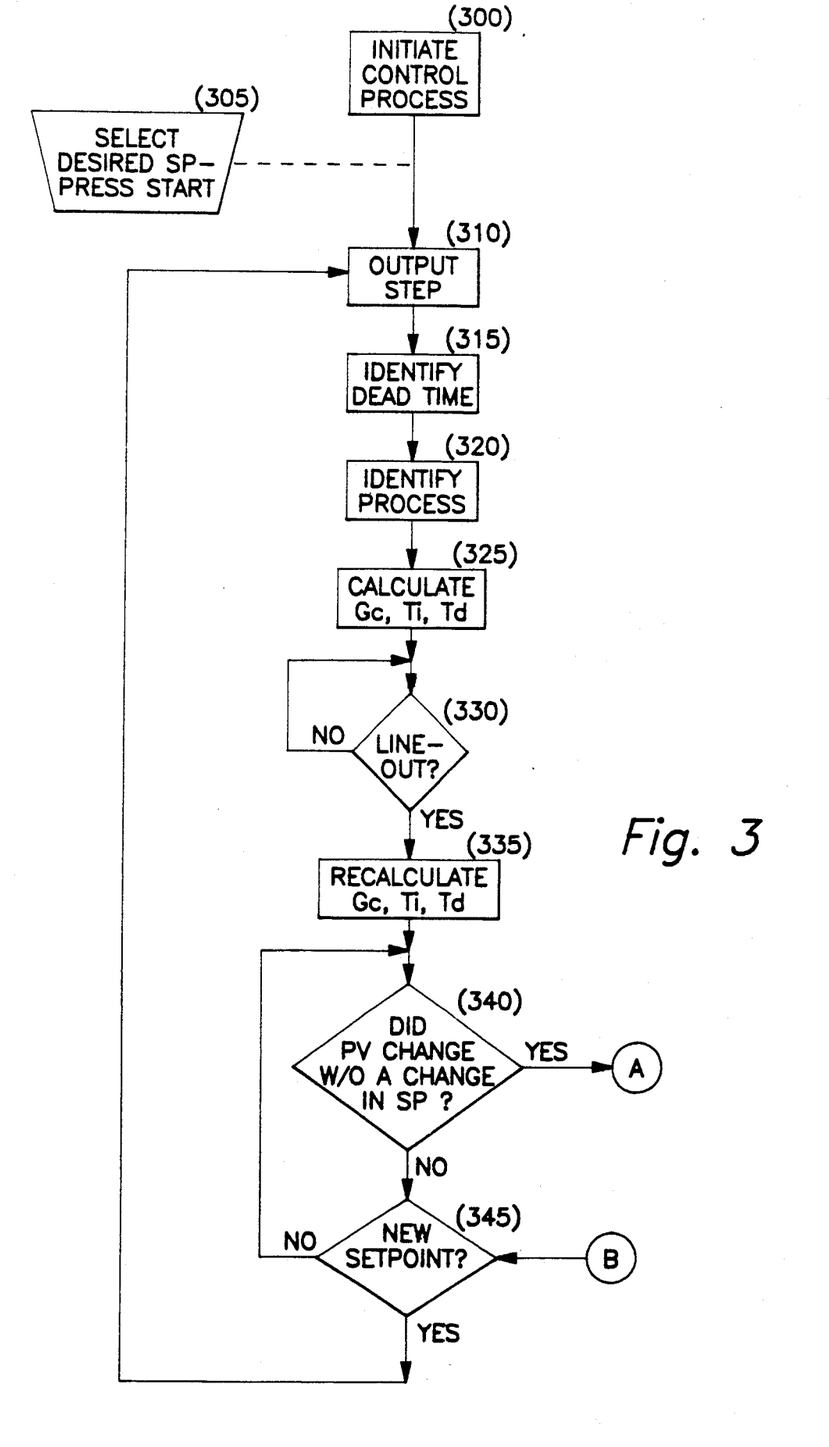
FIG. 3 shows a flow diagram of the adaptive control method of the preferred embodiment of the present invention.

Depending on the process 10 (ie, $G_2(s)$), the controller 20 is adapted to yield a critically damped system by switching K(s), I(s), and/or S(s) (by setting appropriate constant equal some determined value or equal to zero or any other equivalent means). The tuning constants (or PID constants which correspond to K, I, and S, herein) to be determined are:

$G_c$ = Controller gain
$T_i$ = integral time constant
$T_d$ = derivative time constant
a = the rate gain coefficient which is fixed at 0.125 in the preferred embodiment of present invention Referring to FIG. 3 there is shown a flow diagram of the adaptive control method of the preferred embodiment of the present invention. The method of the preferred embodiment of the present invention starts with initiating the control process (block 300). In the initiation process a user brings the process to about ten percent of its range in a manual mode. The user selects a setpoint to a low value process variable, the process variable typically being about ten percent of the maximum capability output (eg, process variable would indicate about a ten percent valve open if the process variable is controlling a valve, turn on a burner ten percent to obtain a low heat output if the process variable is controlling a furnace, . . . ). Finally when lineout occurs (sp=pv) in this startup mode the process is in essentially a wait mode.

When automatic control is to start, a desired setpoint is inputted to the control system and the auto process is told to begin which generally is a manual operation such as depressing an "Auto Start" pushbutton (block 305). The controller 20 calculates an output value, $C_0$, which anticipates the process variable to equal the setpoint. This calculation is based on the controller output that was required to get pv to its ten percent position. The controller 20 outputs a step signal to the calculated value (block 310) and begins to identify the dead time (block 315). The controller looks for the process variable to start moving after the output of the step change, and measures the time it takes from the step change to some pre-determined small increase in the pv value. This time is referred to as dead time, DT. If the process variable value increases immediately upon outputting the step signal, the controller determines there is no dead time, (DT=0). The method continues to identify the type process 10 which is included in the control system 1 (block 320). When the pv value starts to rise, the controller 22 measures the slope. If the slope continuously decreases from the start of the rise, the process then is identified as a single lag. A process time constant, $T_1$ and a steady gain, K, are calculated from equations 4 and 5.

$$T_1 = \frac{PV_2 - PV_1}{PV_1' - PV_2'} \quad (4)$$

$$K = \frac{PV_2 + PV_2' T_1}{C_0} \quad (5)$$

Where: $PV_1$ and $PV_2$ are two measurements of PV during its rise. $PV_1'$ and $PV_2'$ are two slope measurements that correspond to $PV_1$ and $PV_2$. $C_0$ is the controller output step size.

Figure 4:
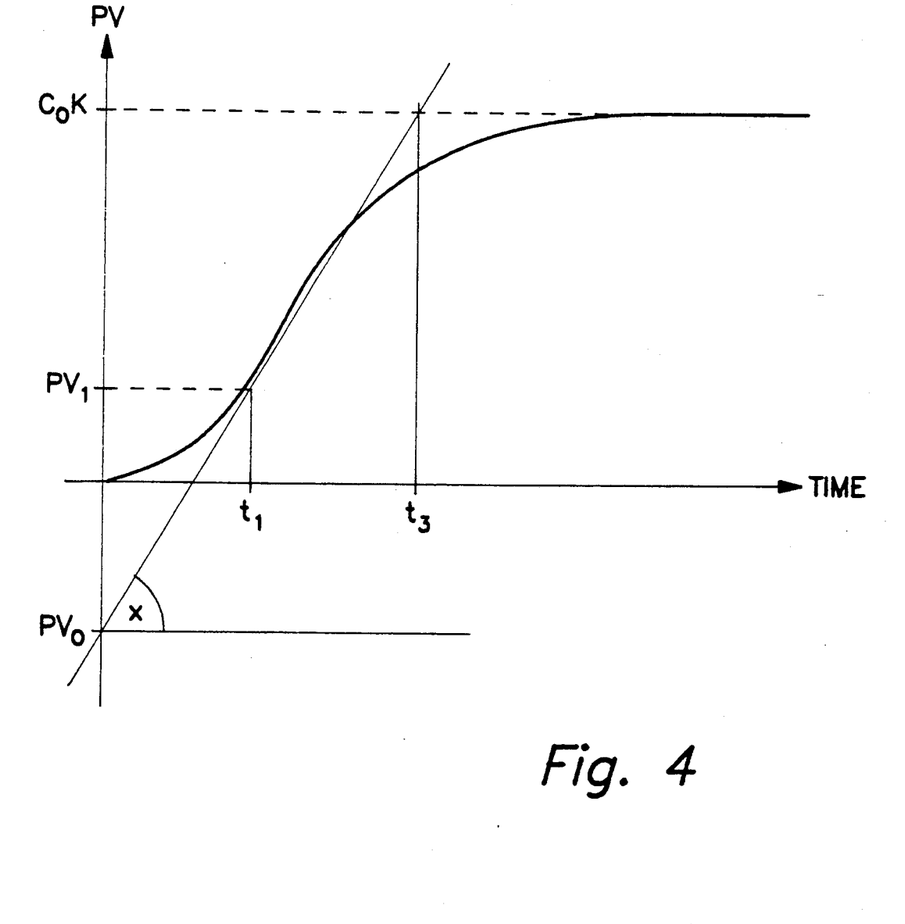
FIG. 4 shows a typical curve of a process variable as a function of time for a two lag process.

If the pv value starts to rise, the controller measures the slope. If the slope rises to a maximum and then decreases the process is identified as having two lags. The time from the start of the rise to the point of maximum slope is measured and referred to as $t_1$. The process time constants $T_1$, $T_2$, and the steady state gain, K, are calculated in accordance with the procedure as described below. Referring to FIG. 4, there is shown a curve of the process variable as a function of time for a two lag system.

From the general equation $$KC_0 = PV + (T_1 + T_2) \, PV'$$

$C_0 K = mfnt_1 + PV_1$ is readily derived.

Where:
m = tan x = $PV_1'$, and
$PV_1$ = Process Variable at $t_1$
Further,

| N | fn |
|---|-----|
| 10 | 4.3 |
| 8 | 3.8 |
| 6 | 3.3 |
| 4 | 2.7 |
| 2 | 2.2 |

Where:
n = $T_1/T_2$
fn = $\frac{T_1 + T_2}{t_1}$

By measuring $t_1$, $PV_1$ & $PV_1'$, by knowing $C_0$, and by choosing fn=3.3, K, $T_1$ & $T_2$ can be reasonably approximated. This approximation is used for initial controller tuning (which will be described hereinunder) for calculating $G_c$, $T_i$, and $T_d$ (block 325).

As the process approaches line out, (block 330) an accurate value of K is measured and a new value of fn is calculated. From this, new values of $T_1$ & $T_2$ are calculated, and the controller is retuned more accurately (block 335).

After the recalculation of Block 335, the controller monitors pv and sp. If a process parameter change occurs, without a corresponding change in the setpoint sp, (block 340), changes in the process parameters are determined. If no pv change occured without a corresponding change, a setpoint is monitored to determine if a new setpoint is inputted (block 345). If no new setpoint is inputted the controller 22 continues to monitor the system to maintain the desired output pv. If a new setpoint is inputted (block 345), the process starts over with the output step of block 310 and repeats the identification of the dead time and process in the calculation of the process parameters (blocks 310 through 335).

When a process variable change is detected without the corresponding change in the setpoint (block 340) changes in the process parameters are determined.

Figure 5:
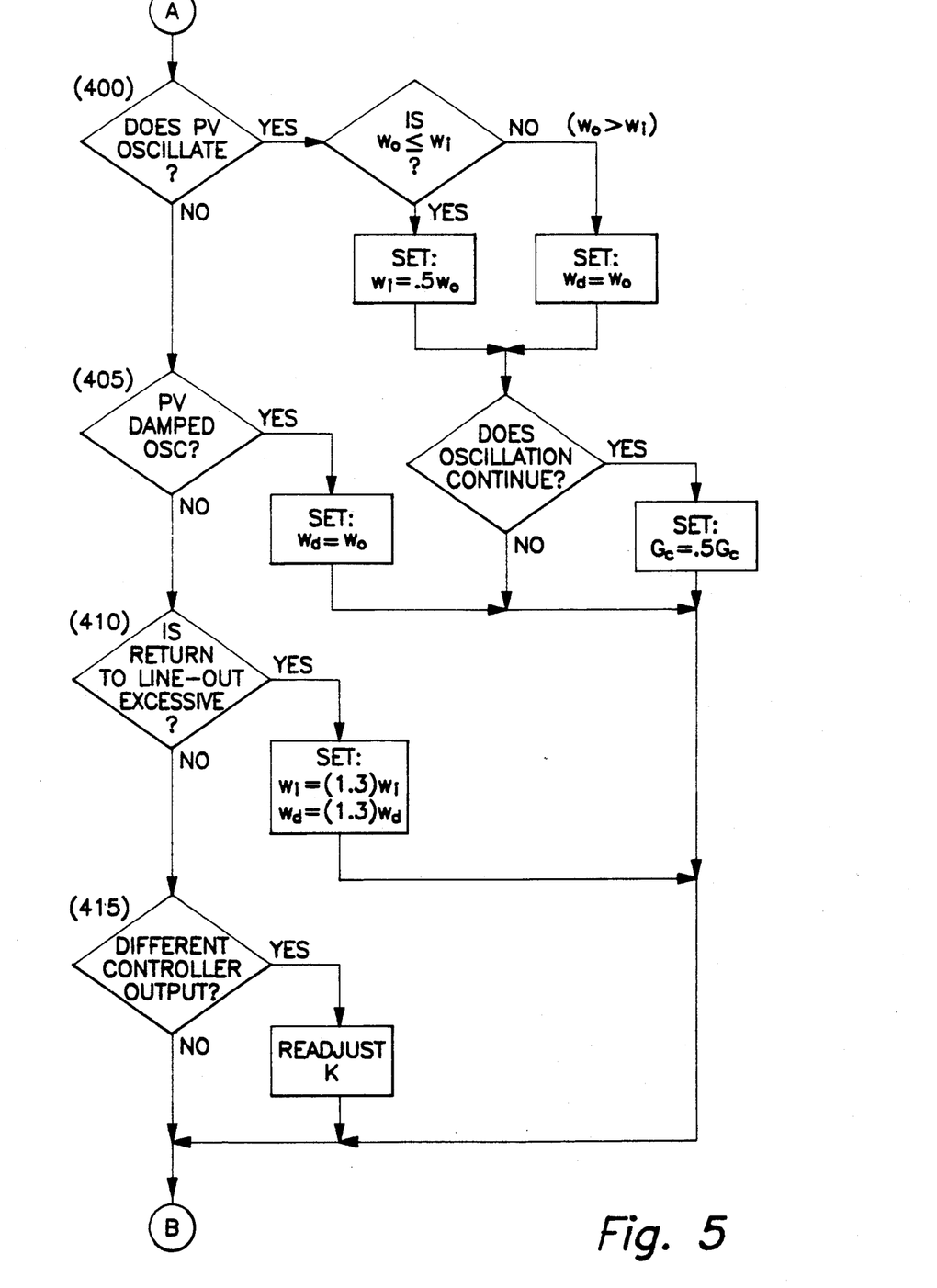
FIG. 5 shows a flow diagram of the process change compensation of the preferred embodiment of the present invention.

Referring to FIG. 5, there is shown a flow diagram of the process change compensation.

If changes in process parameters cause PV to oscillate at a frequency, $w_o$ (block 400), $$w_o \leq w_i, \text{ where: } w_i = \frac{1}{T_i}$$

($T_i$ = Integral time constant)
The controller 22 will shift its notch such that:

$$w_i = 0.5 \, w_o.$$

If $w_o > w_i$
The controller will shift its notch such that: $w_d = w_o$
Where:

$$w_d = \frac{1}{T_d}$$

($T_d$ = Derivative (rate) time constant)
If oscillation continues, the controller will cut its gain in half.

If changes in the process cause PV to go into a damped oscillation at a frequency, $w_o$, (block 405) the controller 22 makes:

$$w_d = w_o$$

If a process disturbance occurs and the time to return to line out is:

$$t > DT + T_1 + T_2 \text{ (block 410)}$$

Where:
t is time
DT = dead time
$T_1$ & $T_2$ process time constants,
the controller 22 will shift the notch higher in frequency by multiplying $w_i$ and $w_d$ by 1.3.

If the process gain changes such that a different controller output is required to maintain PV at the same setpoint (block 415), the new process gain is determined by $$K_n = K_o \frac{C_{oo}}{C_{on}}$$

Where:
$K_n$ = New process gain
$K_o$ = Old process gain
$C_{oo}$ = Old controller output
$C_{on}$ = New controller output In the manner described above the process controller automatically adapts itself to any changes in the process without any external intervention.

Controller tuning is described in Appendix A. Other processes can be identified in the preferred embodiment of the present invention such as those processes 10 with three lags. These processes typically appear as two lags and a dead time. The preferred embodiment of the present invention identifies the process as such and the controller 22 would be appropriately tuned as described above.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

APPENDIX A

In general, there are three methods of controller tuning used. These methods apply to setpoint changes in processes with and without dead time and to process parameter changes in any process.

The controller transfer function is the PID equation with real zeroes.

$$C(s) = G_c \frac{(ST_i + 1)(ST_d + 1)}{ST_i(SaT_d + 1)} \quad \text{(A)}$$

Where:
$G_c$ = Controller gain
$T_i$ = The integral time constant
$T_d$ = The derivative time constant
a = The rate gain coefficient (a = 0.125)

For setpoint changes in processes without dead time, the controller tuning method is pole cancellation. The zeroes of EQ(A) are tuned to cancel the process poles in EQ(B).

$$P(s) = \frac{K}{(ST_1 + 1)(ST_2 + 1)} \quad \text{(B)}$$

Where:
K = Process steady state gain
T1, T2 = Process time constants ($T_1 > T_2$)

In pole cancellation tuning:

| Two Lag Process | One Lag Process |
|---|---|
| $T_i = T_1$ | $T_i = .16 \, T_1$ |
| $T_d = T_2$ | $T_2 = 0$ |
| $G_c = 6/K$ | $T_d = 0$ |
|  | $G_c = 24/K$ |

For setpoint changes in processes with dead time, the controller tuning method is one developed by E. B. Dahlin. The process transfer function is:

$$P(s) = \frac{Ke^{-DTs}}{(ST_1 + 1)(ST_2 + 1)}$$

Where:
DT = Dead time

In Dahlin tuning:

| Two Lag Process | One Lag Process |
|---|---|
| $T_i = T_i + T_2$ | $T_i = T_1$ |
| $T_d = \dfrac{T_1 T_2}{T_1 + T_2}$ | $T_d = 0$ |
| $G_c = \dfrac{3}{K\left(1 + \dfrac{3DT}{T_i}\right)}$ (c) | (Same as EQ C) |

We claim:
1. In a process control system, having an adaptive controller which controls a process variable of a process, said process having a predetermined transfer func- tion and predetermined process parameters associated therewith, the adaptive controller being tuned to said process such that an output control signal from the adaptive controller coupled to the process causes the process to output a process variable signal (corresponding to a value associated with the process variable) having predetermined characteristics, a method for adaptively tuning said adaptive controller, comprising the steps of:

upon receiving an input which indicted the control process is to start,

A) outputting a step function for the output control signal having a value in which the process variable signal is to equal a setpoint signal value, the setpoint signal being inputted to the process control system;

B) sensing the process variable signal to identify the process;

C) calculating tuning parameters for said adaptive controller;

D) after line-out occurs, monitoring the process variable signal;

E) if any change occurs in the process variable signal without a corresponding change in the setpoint signal;

i) adjusting the tuning parameters to compensate for process parameter changes; which comprises the steps of:

a) determining if the process variable signal oscillates, whereupon, if the frequency of oscillation of the process variable is equal to or less than a frequency corresponding to the integral time constant;

i) increasing the integral time constant, otherwise          ii) setting the derivative time constant equal to the period of oscillation, and          iii) if the oscillation continues after the adjustments of step (E.i.a.i and E.i.a.ii) reducing the controller gain;

b) determining if the process variable signal is a damped oscillatory signal, whereupon          i) setting the derivative time constant to the period of oscillation;

c) determining if the process variable signal return to lineout is excessive, whereupon the integral time constant and derivative time constant are decreased in value;

d) determining if the process gain changes such that a different adaptive controller output is required to maintain the process variable signal at the same setpoint signal value, whereupon a new process gain is calculated; and    ii) proceeding to step (F);

iii) otherwise, if no change occurs in the process variable signal, proceeding to step (F); and F) if a new setpoint value is inputted,    i) repeating said method starting at step (A); otherwise    ii) repeating step (E).

2. In a process control system, having an adaptive controller which controls a process variable of a process, said process having a predetermined transfer function and predetermined process parameters associated therewith, the adaptive controller being tuned to said process such that an output control signal from the adaptive controller coupled to the process causes the process to output a process variable signal (corresponding to a value associated with the process variable) having predetermined characteristics, a method for adaptively tuning said adaptive controller, comprising the steps of:

upon receiving an input which indicated the control process is to start,

A) outputting a step function for the output control signal having a value tin which the process variable signal is to equal a setpoint signal value, the setpoint signal being inputted to the process control system;

B) sensing the process variable signal to identify the process;

C) calculating tuning parameters for said adaptive controller, which comprises the steps of:

i) performing initial controller tuning;

ii) waiting for line-out to occur; and iii) calculating final values of tuning parameters to more accurately tune said adaptive controller;

D) after line-out occurs, monitoring the process variable signal;

E) if any change occurs in the process variable signal without a corresponding change in the setpoint signal;

i) adjusting the tuning parameters to compensate for process parameter changes, the tuning parameters including controller gain, integral time constant, and derivative time constant, which comprises the steps of:

a) determining if the process variable signal oscillates, whereupon, if the frequency of oscillation of the process variable is equal to or less than a frequency corresponding to the integral time constant;

i) increasing the integral time constant, otherwise          ii) setting the derivative time constant equal to the period of oscillation, and          iii) if the oscillation continues after the adjustments of step (E.i.a.i and E.i.a.ii) reducing the controller gain;

b) determining if the process variable signal is a damped oscillatory signal, whereupon          i) setting the derivative time constant to the period of oscillation;

c) determining if the process variable signal return to lineout is excessive, whereupon the integral time constant and derivative time constant are decreased in value;

d) determining if the process gain changes such that a different adaptive controller output is required to maintain the process variable signal at the same setpoint signal value, whereupon a new process gain is calculated; and    ii) proceeding to step (F);

iii) otherwise, if no change occurs in the process variable signal, proceeding to step (F); and F) if a new setpoint value is inputted,    i) repeating said method starting at step (A); otherwise,    ii) repeating step (E).

* * * * *